United States Patent [19]
Patel et al.

[11] Patent Number: 5,853,843
[45] Date of Patent: *Dec. 29, 1998

[54] RECYCLABLE HEADLINER MATERIAL

[75] Inventors: Tushar M. Patel, Macomb Township; Stuart G. Boyd, North Street; Mark J. Brow, Allen Park; Philip L. Guthrie, Farmington Hills, all of Mich.

[73] Assignee: UT Automotive Dearborn, Inc., Dearborn, Mich.

[*] Notice: This patent issued on a continued prosecution application filed under 37 CFR 1.53(d), and is subject to the twenty year patent term provisions of 35 U.S.C. 154(a)(2).

[21] Appl. No.: 614,827

[22] Filed: Mar. 8, 1996

[51] Int. Cl.$^6$ ........................................ B32B 3/12
[52] U.S. Cl. ..................... 428/116; 156/267; 156/292; 296/214; 442/55
[58] Field of Search ................ 428/73, 116, 430; 296/214; 264/322; 442/55; 156/267, 292

[56] References Cited

U.S. PATENT DOCUMENTS

| | | | |
|---|---|---|---|
| 3,211,253 | 10/1965 | Gonzalez | 428/116 X |
| 3,366,530 | 1/1968 | Kodich | 428/116 |
| 3,450,593 | 6/1969 | Fossier et al. | 428/73 |
| 3,902,732 | 9/1975 | Fosha, Jr. et al. | 428/116 X |
| 3,963,846 | 6/1976 | Bourke | 428/116 X |
| 4,012,363 | 3/1977 | Bruning et al. | 428/430 X |
| 4,207,366 | 6/1980 | Tyler | 428/116 X |
| 4,256,797 | 3/1981 | Stamper et al. | 428/215 |
| 4,363,848 | 12/1982 | Le Duc et al. | 428/286 |
| 4,840,832 | 6/1989 | Weinle et al. | 428/156 |
| 4,957,797 | 9/1990 | Maeda et al. | 428/77 |
| 5,082,716 | 1/1992 | Satterfield et al. | 428/175 |
| 5,180,628 | 1/1993 | Haardt et al. | 428/215 |
| 5,582,906 | 12/1996 | Romesberg et al. | 442/55 |

FOREIGN PATENT DOCUMENTS

| | | |
|---|---|---|
| 2310871 | 12/1976 | France . |
| 2354877 | 1/1978 | France . |
| 9302870 | 3/1993 | Germany . |
| 4214389 | 4/1993 | Germany . |
| 1149270 | 4/1969 | United Kingdom . |

OTHER PUBLICATIONS

International Search Report—PCT/US 97/03103, Jul. 9, 1998.

Honeycomb Sandwich Structures, pp. 55–56, I.F. Coleby, Ciba–Geigy Bonded Structures Division.

*Primary Examiner*—Henry F. Epstein
*Attorney, Agent, or Firm*—Howard & Howard

[57] ABSTRACT

A unique material is disclosed for use in trim panels, such as headliners. The unique material includes a central polyester honeycomb core, and outer polyester layers providing an I-beam construction. In a most preferred embodiment of this invention, the layers are all formed of polyester such that portions trimmed away from the panel are easily recycled. In addition, since the honeycomb core is formed of a thermoplastic, it is easily molded to desired shapes. The honeycomb core provide good strength to weight characteristics and also good acoustic characteristics.

17 Claims, 2 Drawing Sheets

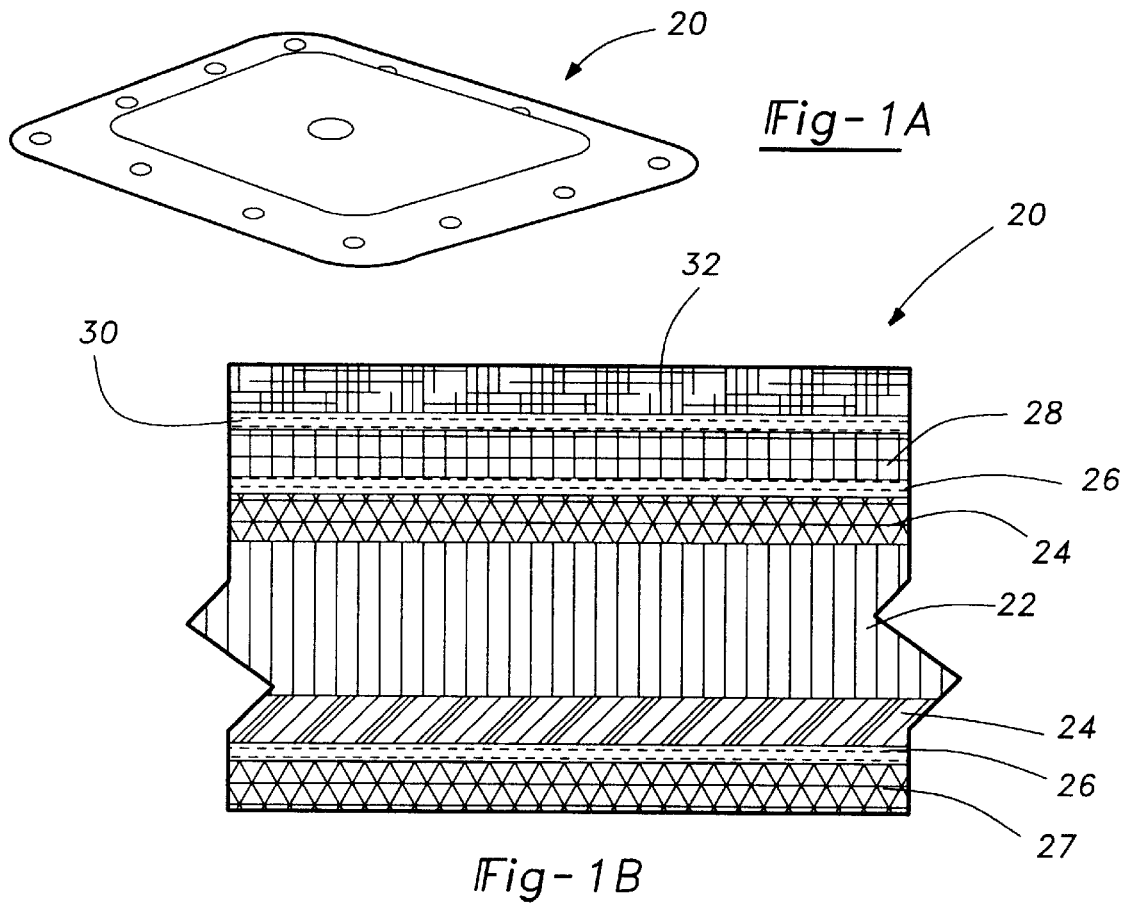
*Fig-1A*
*Fig-1B*
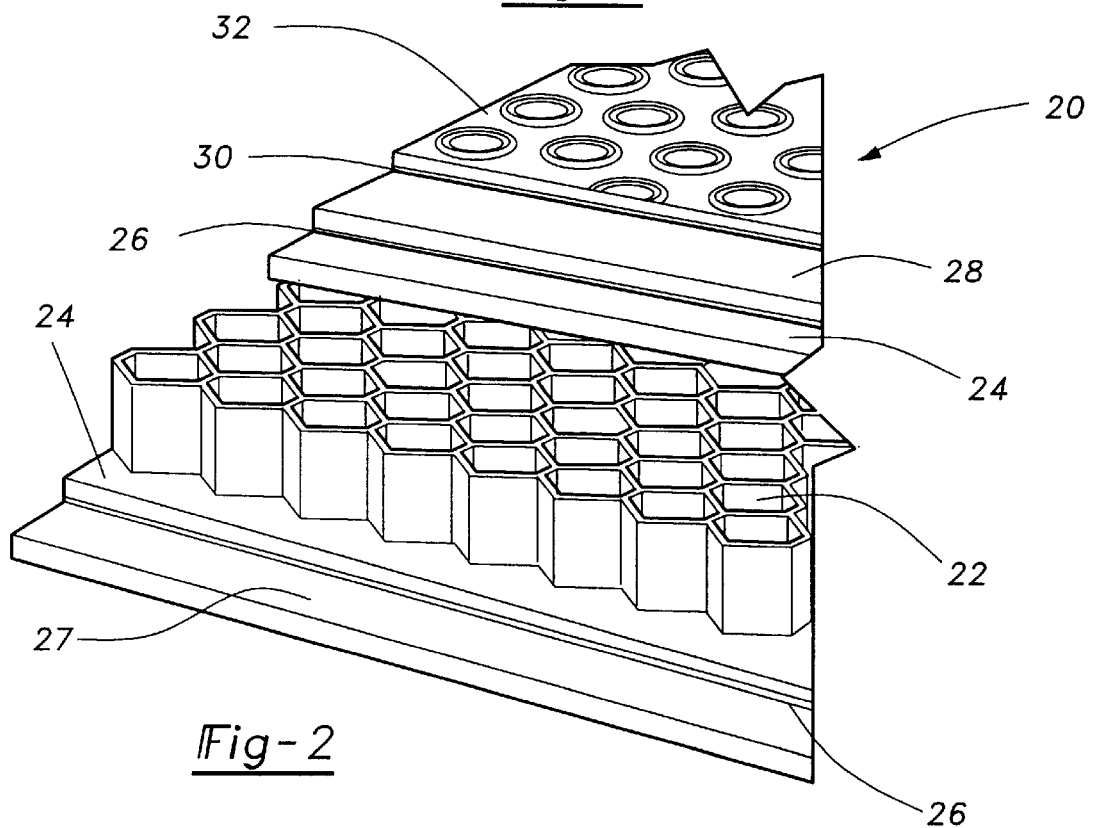
*Fig-2*

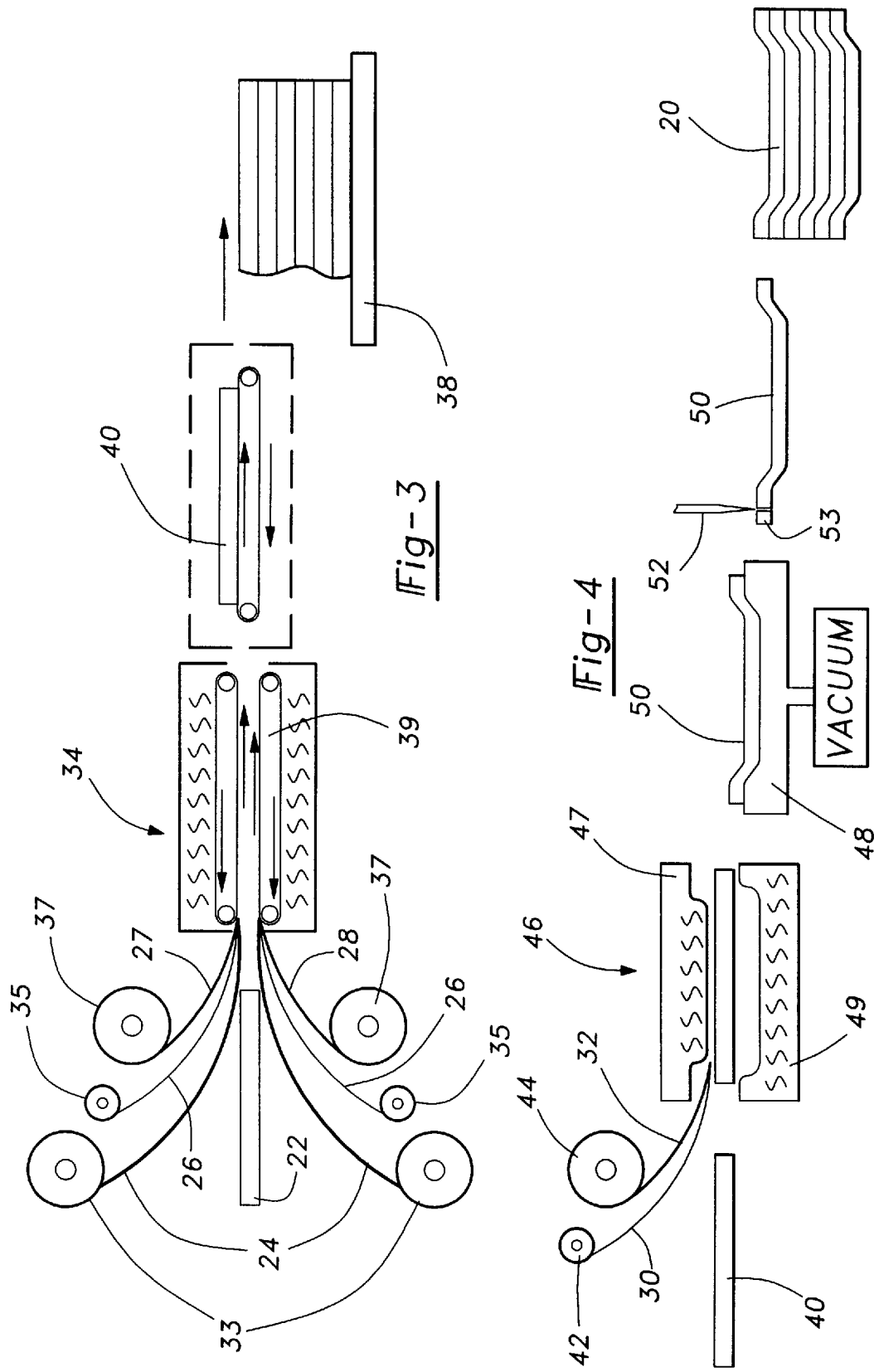

RECYCLABLE HEADLINER MATERIAL

BACKGROUND OF THE INVENTION

This invention relates to a headliner material having several layers, which are all formed from a single plastic, such that the headliner material is easily recyclable. The headliner also incorporates a honeycomb core that provides good strength to weight and acoustic characteristics.

In the prior art, headliners typically include a number of different layers of material. Typically, a foam core of some type is laminated to outer layers to create an I-beam construction, and provide sufficient strength to the headliner. The prior art has also utilized cardboard or other paper structures as the core material for relatively inexpensive headliners. Paper cores are not moldable, however, and instead are crushed to shape in a mold. Thus, there are some drawbacks to these material.

In the known methods of forming headliners, several layers of material are assembled into a headliner material. The layers are then molded into the desired shape for the headliner. The headliner typically conforms to the shape of the vehicle ceiling. Portions of the molded headliner material that are not to be part of the final headliner are then cut away. It is not uncommon for over 20% of the molded headliner material to be cut away as waste.

Known headliners typically include several different types of materials. Thus, the waste product also typically includes several different types of materials. It is difficult to recycle these different materials, as they consist of several thin layers of different materials which must be somehow separated prior to recycling.

SUMMARY OF THE INVENTION

The present invention discloses a headliner wherein all layers are formed of a single plastic material. In one preferred embodiment, all of the layers are formed of polyester. In this way, the trim waste from the headliner may be easily recycled. The waste material may be simply melted down and then reused for other purposes. This invention not only has environmental benefits, but also reduces the cost of the headliner, as the cost for the recycled material is recovered.

In addition, the present invention discloses the use of a moldable honeycomb core material. The honeycomb core provides good strength to weight characteristics, and also excellent acoustic characteristics. The honeycomb material is used in combination with I-beam layers to provide sufficient strength and rigidity. The moldable honeycomb material easily adapts to a desired shape during the molding process of the headliner.

While the specific disclosed embodiments in this application show the unique material utilized as a headliner, it should be understood that the material can be utilized for other vehicle trim applications, and even for non-vehicle applications.

These and other features of the present invention will be best understood from the following specification and drawings, the following of which is a brief description:

BRIEF DESCRIPTION OF THE DRAWINGS

FIG. 1A is a perspective view of a vehicle headliner made with the inventive material.

FIG. 1B is a cross-sectional view through the headliner of FIG. 1A.

FIG. 2 is a partially cut-away view of the headliner material showing the several layers.

FIG. 3 shows a first step in forming the inventive headliner.

FIG. 4 shows a final step in forming the headliner of the present invention.

DETAILED DESCRIPTION OF THE PREFERRED EMBODIMENT

A headliner 20 is illustrated in FIG. 1A. As is known, the headliner is formed of several layers of distinct materials shaped to conform to the approximate desired configuration of the vehicle ceiling which is to receive the headliner. The formation of a headliner from a number of layers typically includes a trim operation wherein portions of the layers that are not desired in the final headliner are cut away. In the prior art, those cut-away portions have been waste. The present invention improves upon the prior art by forming a headliner from material that is recyclable. Although the present invention specifically discloses the use of the material in a headliner, it should be understood that other applications, including other vehicle trim applications, would come within the scope of this invention.

As shown in FIG. 1B, the headliner 20 includes a number of layers. A central layer 22 is formed of a honeycomb material. Layers 24 on either side of the honeycomb layer are preferably formed of a relatively strong material that will create an I-beam construction in combination with the central honeycomb core 22. Layers 26 are adhesives which secure the layers 24 to the outer layers 27 and 28. The outer layers 27 and 28 are preferably formed of a non-woven fabric. Layer 30 is again an adhesive which secures the non-woven fabric layer 28 to a trim layer 32. It is a main feature of the present invention that all of the layers shown in FIG. 1B, including the adhesives, be formed of the same basic plastic. As one preferred embodiment, each of the layers are preferably formed of polyester materials. That is, while the several layers are formed of different materials, the materials themselves are all formed of a single type plastic. Alternatively, other plastic materials such as polyethylene or polypropylene may be utilized to form all of the layers.

In FIG. 2, the headliner 20 is shown with portions cut away. As shown, the core 22 is formed of a honeycomb material having relatively high strength and low weight. The honeycomb material is formed of a thermoplastic material, and thus is moldable to any desired configuration. This improves upon the prior art honeycomb cores formed of paper that were not moldable.

Layers 24 surround honeycomb core 22 to form an I-beam construction. Adhesive layers 26 are secured outwardly of layers 24, and secure non-woven fabric layers 27 and 28 to the layers 24. Another adhesive layer 30 secures layer 28 to the trim layer 32. The trim 32 is shown with exaggerated stylistic features such that the fact that it is a trim layer is more easily identified.

The method of forming the inventive headliner is shown in FIGS. 3 and 4. As shown in FIG. 3, the core material 22 approaches a first lamination station 34. At station 34, the pad layers 24 from coils 33 are placed on the core 22. Adhesives webs 26 come off of coils 35, and the non-woven fabrics 27 and 28 are removed from their coils 37. These materials all move as a sandwich between a Teflon™ heated belt laminator 39, set at approximately 180° C. The sandwiched material moves at a speed of 3–10 meters per minute, and most, preferably approximately 4 meters per minute.

The heated layers are then in the form of sandwiched blanks 40, which are transferred onto a holding station 38.

The sandwiched blanks 40 have been heated such that the several layers are bonded together.

As shown in FIG. 4, the blanks 40 are then brought to another station where another adhesive web 30 from a coil 42 is directed onto the blank 40. The fabric trim layer 32 is moved from a coil 44 on top of the adhesive layer 30.

Mold 46 including a backside tool 47 set at approximately 180° C., and a front side tool 49 set at approximately 150° C. then molds the part. The part is preferably molded for 30 to 60 seconds to allow the sandwich to achieve a uniform temperature, and to set the shape and activate the several adhesives. The heated molded blank 50 is then carried from the mold onto a cooling fixture 48 having the same contour as desired for the final part. A vacuum suction is applied to the blank 50 to hold the part until it cools to at least 38° C., or cooler.

The blanks 50 are then trimmed at station 52 to result in the final headliner shapes 20 as shown at 54. In the trim operation 52, shown schematically, a good deal of the material 53 from the blank 50 becomes waste material. This waste material is recyclable with the present invention since all of the layers are formed of a single plastic material. The waste materials may be merely melted and reused. As discussed above, although it is preferred that polyester-based materials be used, other thermoplastics, such as polyethylene, or polypropylene may also be substituted.

The honeycomb material is preferably a non-woven polyester obtained from Hexcel Corporation. The layers may have different thicknesses ranging between 6.0 mm to 12.0 mm. The dimension d (see FIG. 2) across the honeycomb web is preferably 0.125 in–0.375 in., with 0.250 in preferred.

The needled non-woven layers 24 are preferably formed with 100% blended polyester of combined low melt and high melt fibers. The low melt fibers bind the layers 24 to core 22. The weight is preferably between 100 g/m$^2$ and 200 g/m$^2$, with 110 g/m$^2$ being the most preferred.

The adhesive layers 27 and 28 may all be hot melt web adhesives formed of polyester, or hot melt polyester powder binders. The adhesives preferably have a weight of 15 g/m$^2$ to 40 g/m$^2$, with 20 g/m$^2$ being the most preferred.

The additional layers 27 and 28 help bridge any low spots that bleed through the pads 24 from the honeycomb structure. These additional non-woven fabrics are also formed of polyester, and preferably weigh between 40 g/m$^2$ and 250 g/m$^2$, with 50 g/m$^2$ being most preferred.

The decorative trim is preferably a polyester needled felt, and weights between 100 g/m$^2$ and 250 g/m$^2$, with 200 g/m$^2$ being most preferred.

The present invention thus provides a headliner material that is recyclable such that waste materials may be easily reused. In addition, the honeycomb core provides high strength to low weight, while also providing good acoustic characteristics. In the preferred embodiment, the layers are formed from fibrous polyester material which also improves the acoustic absorption of the honeycomb headliner material.

A preferred embodiment of this invention has been disclosed, however, a worker of ordinary skill in the art would recognize that certain modification may come within the scope of this invention. For that reason the following claims should be studied to determine the true scope and content of this invention.

We claim:

1. A vehicle headliner trim panel comprising:
    a central honeycomb core formed of a moldable plastic material, said honeycomb core having two opposed outer faces;
    pad layers disposed on each of said outer faces to create an I-beam combination with said core, each said pad layer being non-woven and formed of a combination of low melt and high melt fiber pieces, said low melt pieces will melt upon application of heat;
    a decorative trim layer placed on a face of one of said pad layers spaced from said core; and
    said core, said pad layers and said trim layer being shaped into a non-planar configuration.

2. A trim panel as recited in claim 1, wherein said core, said pad layers and said decorative trim layer are all formed of the same family of plastic.

3. A trim panel as recited in claim 2, wherein all of said layers are formed of polyester.

4. A trim panel as recited in claim 3, wherein polyester adhesives are placed at least between said one pad layer and said decorative trim.

5. A trim panel as recited in claim 4, wherein non-woven polyester layers are placed between said one pad layer and said decorative trim, and also on the other of said pad layers, and polyester adhesives being placed between said non-woven layers and said pad layers.

6. A trim panel as recited in claim 5, wherein said pad layers are formed of a needled polyester.

7. A trim panel as recited in claim 5, wherein said adhesives are polyester web adhesives.

8. A trim panel as recited in claim 5, wherein said polyester adhesives are powder adhesives.

9. A trim panel comprising:
    a central plastic core layer;
    a pair of pad layers placed on opposed outer faces of said central plastic core each said pad layer being formed of a combination of low melt and high melt fiber pieces;
    a trim layer placed outwardly of one of said pad layers, such that said pad layers form an I-beam construction with said core layer, and said trim layer provides a decorative surface; and
    said core layer, said pad layers, and said decorative trim all being formed of polyester.

10. A trim panel as recited in claim 9, wherein polyester adhesives are placed at least between said one pad layer and said decorative trim.

11. A trim panel as recited in claim 9, wherein additional non-woven polyester layers are placed between said one pad layer and said decorative trim, and also on the other of said pad layers, and polyester adhesives being placed between said non-woven layers and said pad layers.

12. A trim panel as recited in claim 11, wherein said adhesives are polyester web adhesives.

13. A trim panel as recited in claim 11, wherein said polyester adhesives are polyester powder adhesives.

14. A trim panel as recited in claim 9, wherein said panel is utilized as a vehicle headliner.

15. A method of forming a vehicle headliner trim panel comprising the steps of:
    (1) providing a moldable honeycomb core, providing pad layers on each side of said honeycomb core, said pad layers being formed of the combination of low melt and high melt fiber pieces so that upon application of heat said low melt pieces melt to bind said pad layers, such that an I-beam configuration is provided, and providing a decorative trim layer outwardly of one of said pad layers and wherein all of said layers are formed of polyester based materials;

(2) heating said several layers to secure said several layers together;

(3) then molding said several layers into a desired non-planar shape for use as a vehicle headliner; and (4) trimming portions of said molded material away to result in a desired final shape.

16. A method as recited in claim 15, comprising the further substeps of providing non-woven polyester layers outwardly of said pad layers on each of said pad layers in step (1).

17. A method as recited in claim 15, wherein adhesive layers are placed at least between said decorative trim layer and said pad layer prior to step (2).

\* \* \* \* \*